US010346006B1

(12) United States Patent
Shaked et al.

(10) Patent No.: US 10,346,006 B1
(45) Date of Patent: Jul. 9, 2019

(54) METHODS AND SYSTEMS FOR PROVIDING GRAPHICAL USER INTERFACE VISUALIZATIONS

(71) Applicant: Citibank, N.A., New York, NY (US)

(72) Inventors: Ido Shaked, Pardes Hana-Karkur (IL); Raphael Menachem, Yehud-Monoson (IL); Ehud Fisher, Rosh Ha'ain (IL); Kfir Amitai, Nahariya (IL)

(73) Assignee: CITIBANK, N.A., New York, NY (US)

( * ) Notice: Subject to any disclaimer, the term of this patent is extended or adjusted under 35 U.S.C. 154(b) by 82 days.

(21) Appl. No.: 14/624,045

(22) Filed: Feb. 17, 2015

(51) Int. Cl.
*G06Q 40/00* (2012.01)
*G06F 3/0484* (2013.01)

(52) U.S. Cl.
CPC ......... *G06F 3/04842* (2013.01); *G06Q 40/00* (2013.01)

(58) Field of Classification Search
CPC ......... G06G 40/00; G06G 40/04; G06G 40/06
USPC .......................................... 705/35, 36 R, 37
See application file for complete search history.

(56) References Cited

U.S. PATENT DOCUMENTS

| 7,177,833 | B1* | 2/2007 | Marynowski | G06Q 40/00 705/35 |
| 7,574,388 | B1* | 8/2009 | Peebler | 705/35 |
| 7,734,529 | B1* | 6/2010 | Zhou | 705/37 |
| 7,801,800 | B1* | 9/2010 | West | 705/37 |
| 7,912,781 | B2* | 3/2011 | Rosenthal | 705/37 |
| 2005/0149428 | A1* | 7/2005 | Gooch | G06Q 40/04 705/37 |
| 2006/0259417 | A1* | 11/2006 | Marynowski | G06Q 40/04 705/37 |
| 2007/0208654 | A1* | 9/2007 | Stearns | 705/37 |
| 2009/0083174 | A1* | 3/2009 | Lynner | G06Q 40/04 705/37 |
| 2010/0057600 | A1* | 3/2010 | Johansen et al. | 705/37 |
| 2010/0293110 | A1* | 11/2010 | Rosenthal | G06Q 40/06 705/36 R |
| 2011/0145165 | A1* | 6/2011 | Haldes et al. | 705/36 R |
| 2011/0238555 | A1* | 9/2011 | Rosenthal | G06Q 40/04 705/37 |
| 2011/0251942 | A1* | 10/2011 | Rosenthal | G06Q 40/04 705/37 |
| 2012/0233051 | A1* | 9/2012 | Sheldon | 705/37 |
| 2013/0297474 | A1* | 11/2013 | Creamer et al. | 705/37 |

* cited by examiner

*Primary Examiner* — Lalita M Hamilton
(74) *Attorney, Agent, or Firm* — Johnson, Marcou & Isaacs, LLC; John M. Harrington, Esq.

(57) ABSTRACT

Methods and systems for providing graphical user interfaces (GUIs) displaying and manipulating visualizations of data involve, for example, displaying, in a graphical user interface, a visually static element representing a risk function threshold value and an animatible element representing a current magnitude of a variable risk function value spaced a distance from the visually static element that is proportional to a difference between the risk function threshold value and the current magnitude of the variable risk function value, and animating the animatible element to change its distance from the visually static element by an amount proportional to a change in the current magnitude of the variable risk function value.

17 Claims, 8 Drawing Sheets

METHODS AND SYSTEMS FOR PROVIDING GRAPHICAL USER INTERFACE VISUALIZATIONS

FIELD OF THE INVENTION

The present invention relates generally to the field of computing device interfaces, and more particularly to methods and systems for providing graphical user interfaces (GUIs) displaying and manipulating visualizations of data, such as option trading data.

BACKGROUND OF THE INVENTION

In option trading, traders holding option positions have inherent risks that they need to manage, which are sometimes referred to as 'Greek' risks because they are typically represented by letters of the Greek alphabet. A major risk factor in foreign exchange, equities and commodities markets options is commonly referred to as 'Delta'. The Delta risk may be defined as a change in the present value of an option deriving from possible changes in the price of the underlying asset. In other words, Delta is the partial derivative of the option price to the underlying asset price or 'Spot'.

A common way for traders to manage the Delta risk is to buy or sell a quantity of the underlying asset that hedges the options risk. For example, if a trader has an option on Eurodollar Spot, the trader may hedge the Delta risk of that option by buying or selling Euros per dollar.

A decision to buy or sell the underlying asset of the hedge may be made based on several factors. One such factor may be the Delta value that represents the level of exposure, which may be positive or negative. Another factor may be the Spot level of the underlying asset. A further factor may be the sensitivity of the Delta to a change in the price of the underlying asset price, which is commonly referred to as 'Gamma'. Thus, Gamma is the second derivative of the present value per Spot and may be characterized, for example, as the Delta of the Delta.

Option traders may consider a strategy to handle this risk when covering, for example, two scenarios. For example, a trader may plan in advance what action to take if the Delta risk increases to a larger positive value, also referred to as a 'long' position, and/or what action to take if the Delta risk moves to a larger negative position of the risk, referred to as a 'short' position. Thus, the trader may consider what may likely happen if the Delta goes long or short beyond a certain level and whether to buy or sell a certain number of units of the underlying asset if either occurs.

For example, a trader holding an ordinary option on Eurodollars may decide in advance that when the Delta value reaches one million dollars, the trader will plan to sell one-half million dollars of the underlying asset to hedge the trade. However, defining, monitoring, visualizing, deciding and executing such a strategy by a trader on the trader's workstation, such as the trader's desktop, laptop, pad, or other computing device, may currently be problematic for the trader.

Another current problem in electronic trading, such as electronic option trading, is a lack of space on display screens of traders' workstations. For example, a trader may have one or more screens open at the same time, each of which may be fully populated to the extent of being cluttered and resulting in a serious lack of desktop space. That situation creates a lack of screen space that is a current problem for traders who are unable to receive all of the information or have access to all of the applications that they may need.

There is a present need for methods and systems for providing graphical user GUIs for displaying and manipulating visualizations of data that furnish, for example, improved, highly intuitive interfaces and at the same time provide efficiency in the use of display screen space in a way that allows users, such as traders, improved access to other information and applications on their workstation that is not possible with traditional interfaces.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the GUI management described herein. Such embodiments provide methods and systems for providing graphical user interface visualizations that may involve, for example, displaying, by one or more processors coupled to memory, in a graphical user interface, a visually static element representing a risk function threshold value and an animatible element representing a current magnitude of a variable risk function value spaced a distance from the visually static element that is proportional to a difference between the risk function threshold value and the current magnitude of the variable risk function value; and animating, by the one or more processors, in the graphical user interface, the animatible element to change the distance by which the animatible element representing the current magnitude of the variable risk function value is spaced from the visually static element representing the risk function threshold value by an amount that is proportional to a change in the current magnitude of the variable risk function value.

In an aspect of embodiments of the invention, displaying the visually static element representing the risk function threshold value may involve, for example, displaying, in the graphical user interface, the visually static element at a position on a graduated scale of risk function values. In another aspect, displaying the visually static element representing the risk function threshold value may involve, for example, displaying, in the graphical user interface, the visually static element in reference to a position on a plot of risk function values against predicted price values. In a further aspect, displaying the animatible element may involve, for example, displaying, in the graphical user interface, a pointer element spaced the distance from the visually static element that is proportional to the difference between the risk function threshold value and the current magnitude of the variable risk function value.

In an additional aspect of embodiments of the invention, displaying the animatible element may involve, for example, displaying, in the graphical user interface, an elongate pointer element having a length that is proportional to the current magnitude of the variable risk function value. In another aspect, displaying the animatible element may involve, for example, displaying, in the graphical user interface, an icon animatible to move in a path defined by a relationship between variable risk function values and variable predicted price values. In still another aspect, displaying the animatible element may involve, for example, displaying, in the graphical user interface, the animatible icon in association with a plot of variable risk function values against the variable predicted price values.

In a further aspect of embodiments of the invention, animating the animatible element may involve, for example, animating, in the graphical user interface, an elongate pointer element having a length that is proportional to the current magnitude of the variable risk function value to increase the length of the elongate pointer by an amount that is proportional to the change in the current magnitude of the variable risk function value. In a still further aspect, animating the animatible element may involve, for example, animating, in the graphical user interface, the elongate pointer element to increase the length of the elongate pointer by the amount that is proportional to the change in the current magnitude of the variable risk function value in a direction parallel to a graduated scale of variable risk function values. In still another aspect, animating the animatible element may involve, for example, animating, in the graphical user interface, an icon to move in a path defined by a relationship between variable risk function values and variable predicted price values.

A still further aspect of embodiments of the invention, may involve, for example, displaying, in the graphical user interface, an action to be performed when the current variable risk function value equals the risk function threshold value. In an additional aspect, displaying the action to be performed may involve, for example, displaying, in the graphical user interface, an order to be executed when the current variable risk function value equals the risk function threshold value. An additional aspect, may involve, for example, displaying, in the graphical user interface, an action to be performed when the current variable risk function value moves beyond the risk function threshold value. In another aspect, displaying the action to be performed may involve, for example, displaying, in the graphical user interface, an alert when the variable risk function value moves beyond the risk function threshold value.

Still another aspect of embodiments of the invention may involve, for example, displaying, in the graphical user interface, a second visually static element representing a second risk function threshold value. In a further aspect, one of said visually static element and said second visually static element displayed in the graphical user interface may represent, for example, a positive risk function threshold value, and the other of said visually static element and said second visually static element displayed in the graphical user interface may represent, for example, a negative risk function value.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1A:
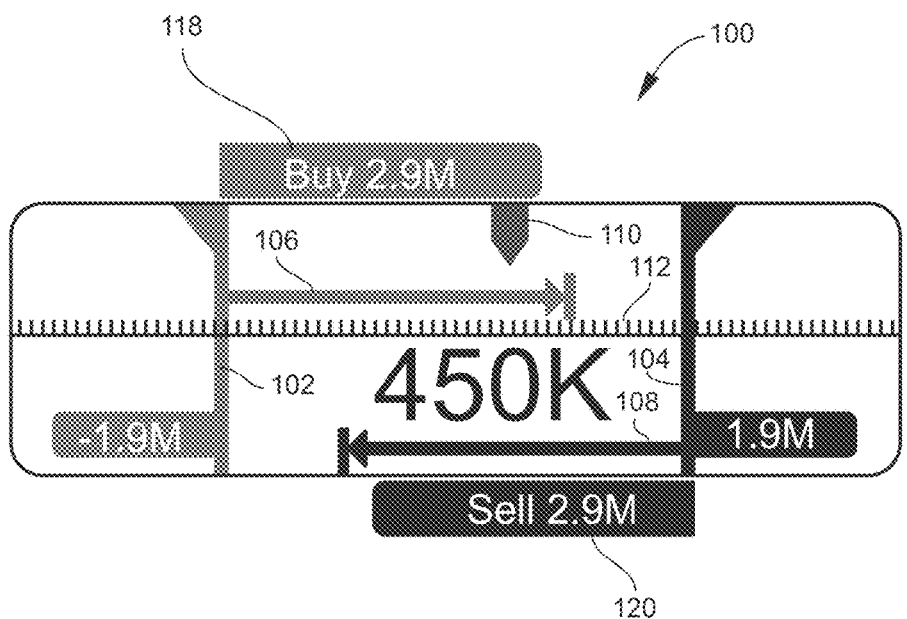
FIGS. 1A, 1B, and 1C illustrate examples of three different views of a Delta risk gauge visualization graphical user interface for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide methods and systems for managing and maximizing the usefulness of a GUI display, for example, for users, such as option traders, that include highly flexible and intuitive Delta gauge and Delta profile interfaces and at the same time provide efficiency in the use of display screen space in a way that allows users, such as option traders, improved access to other information and applications on their workstation and improved decision making by option traders.

The GUI visualization systems and methods for embodiments of the invention may provide, for example, an automated system that executes a risk management strategy and also provides a GUI visualization of the process of defining and monitoring the risk management strategy. Embodiments of the invention may include, for example, Delta gauge and Delta profile visualization aspects. The strategy of buying and selling underlying assets when the Delta changes may be referred to as Gamma trading, and traders using the strategy may be referred to as Gamma traders. Embodiments of the invention may provide automated Gamma trading for such Gamma traders.

Gamma traders who hedge their Delta may typically prefer a strategy of making decisions based on scenarios or strategies that cover instances where the Gamma trader goes long or short Delta. While there are currently tools in the marketplace that cover those strategies, these tools do not overcome the current difficulties of presenting a visualization of the processes of defining and monitoring the strategies in an intelligent, intuitive way using a small amount of screen space. An aspect of the invention provides an interface that represents to users an action that will be taken by the automated Gamma trading tool on behalf of the user in a simple, intuitive way in a very limited space, for example, on a display screen.

The Delta gauge for embodiments of the invention may show a user, for example, a proximity of the user's Delta to a risk threshold that may be dictated by the user's strategy in terms of the Delta value. For example, the Delta gauge visualization may show the user how close the user is approaching a Delta risk of 1 million Eurodollars at which the user's strategy may be to sell 0.5 million Eurodollars of the underlying assets to hedge the trade. The Delta gauge may also alert the user when an action should have been taken already, but was not taken, and what that action should have been. In addition, the Delta gauge may provide a user with immediate feedback on what the impact of changing strategy parameters may be on actions that will be taken by the application for embodiments of the invention. For example, if the user edits his strategy to increase his 1 million Eurodollar Delta risk threshold by fifty percent to 1.5 million Eurodollars, the Delta gauge may provide immediate feedback that a new order, such as a sale of 0.75 million Eurodollars, is in effect.

Figure 1B:
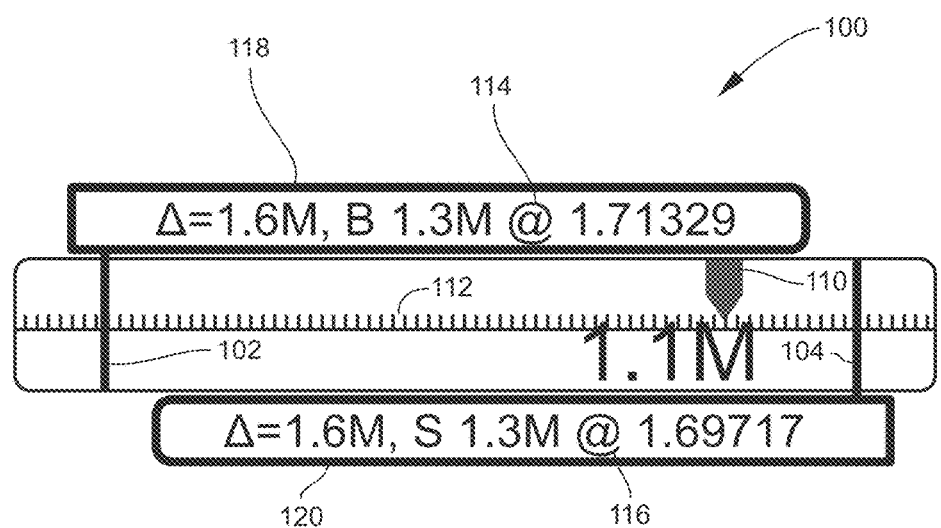
Figure 1C:
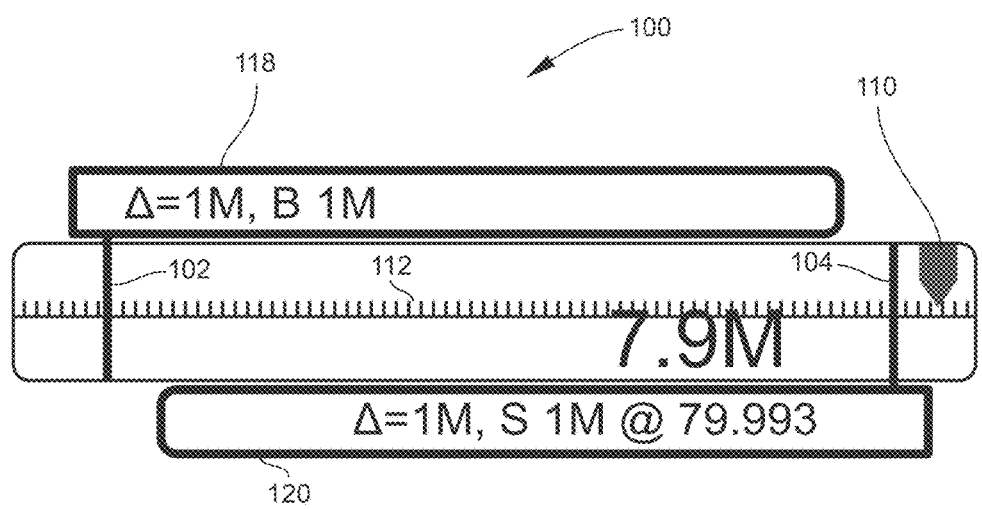

FIGS. 1A, 1B, and 1C show examples of three different views of a Delta risk visualization aspect of the Delta gauge 100 for embodiments of the invention. Referring to FIG. 1A, when a user edits the user's strategy with the Gamma trading tool, the Delta risk visualization interface 100 may respond immediately with animation. Thresholds which may quantify a level of the user's Delta, may be represented, for example, by opposing vertical lines 102 and 104 spaced horizontally from one another on the interface 100. In the sample interface of FIG. 1A, for example, the thresholds 102 and 104 are shown respectively as minus 1.9 million on the left-hand side of the interface 100 and plus 1.9 million on the right-hand side of the interface 100. The horizontal scale 112 may represent a range of Delta values.

Referring further to FIG. 1A, the upper and lower horizontal arrows 106, 108 may represent what will happen, for example, when the Delta reaches a predetermined value. In the example of FIG. 1A, when the lower arrow 108 reaches the Delta value 102 of minus 1.9 million on the left-hand side of the interface 100, 2.9 million of underlying assets will be sold, or when the Delta value 104 reaches positive 1.9 million on the right-hand side of the interface 100, 2.9 million of the underlying asset will be sold. Further, the downwardly extending arrow 110 may represent a current Delta, which in the example shown in FIG. 1A is 450,000 or 450K.

Referring to FIG. 1B, once the user selects a strategy, the Delta gauge visualization 100 may show the actions that will be taken if the Delta value reaches the selected thresholds 102, 104, as well as the estimated or predicted Spot for the action. In the example of FIG. 1B, when the Delta reaches the predetermined value 102 of minus 1.6 million on the left-hand side of the interface 100, 1.3 million of the underlying assets will be bought at an estimated Spot 114 of 1.71329, and when the Delta reaches the predetermined value 104 of 1.6 million on the right-hand side of the interface 100, 1.3 million of the underlying assets will be sold at an estimated Spot 116 of 1.69717. Again, the downwardly extending arrow 110 may represent a current trade Delta, which is 1.1 million. As noted, the horizontal scale 112 may represent a range of Delta values.

Referring to FIG. 1C, if the Delta crosses a predefined threshold 102 or 104, indicating that the strategy defined by the user was not executed, the Delta gauge visualization 100 may alert the user immediately. For example, the thresholds may be displayed in a particular color, such as red. However, it is to be understood that any other color or any other suitable alert mechanism may be employed. In the example shown in FIG. 1C, the user's defined strategy may have included selling 1 million of the underlying assets when the Delta reached positive 1 million. However, in the example, the strategy was not executed, and as shown in the example of FIG. 1C, the Delta, represented by the position of the downwardly extending arrow 110 has now reached 7.9 million. The horizontal scale 112 may likewise represent a range of Delta values.

Referring again to FIGS. 1A, 1B, and 1C, the threshold 102 on the left-hand side of the Delta gauge visualization 100 may correspond to negative or shorter Delta, and the threshold 104 on the right-hand side of the Delta gauge visualization 100 may correspond to positive or longer Delta. In addition, the text 118 at the top of the Delta gauge visualization 100 may correspond to the negative or shorter Delta threshold 102, and the text 120 at the bottom of the Delta gauge visualization 100 may correspond to the positive or longer Delta threshold 104. Referring to the example of FIG. 1B, the strategy defined by the user, as displayed in the text 118 at the top of the Delta gauge visualization 100, may be to buy 1.3 million when the Delta reaches minus 1.6 million, at which point the Spot is estimated or predicted to be 1.71329, and as displayed in the text 120 at the bottom of the Delta gauge visualization 100, may be to sell 1.3 million when the Delta reaches 1.6 million, at which point the Spot is estimated or predicted to be 1.69717.

Embodiments of the invention may provide a trader a sense of transparency and security such that the trader knows, for example, what an application based on an algorithm (sometimes referred to as a 'robot') that is programmed to execute automatically will do at any point in time. Embodiments of the invention may assure that the trader knows at all times exactly what such a 'robot' will do when a particular event, such as reaching a Delta threshold, occurs so that the trader need not be concerned that the 'robot' will do something unexpected. Thus, a trader knows that when the Delta reaches the trader's defined threshold, the trader's defined quantity of underlying assets will be sold or bought at about the estimated Spot.

Embodiments of the invention may provide an interface to one or more applications, based for example on algorithms, running on one or more processors that automatically execute trades for Gamma traders, thereby enabling strategies to be easily defined. A trader's strategy may be defined and edited on the interface and communicated to a processor running the 'robot' which automatically executes the defined strategy. Thereafter, at all times, the interface shows what the strategy is and what actions to expected from the 'robot'.

It is to be understood that the examples of the Delta gauge visualization 100 shown in FIGS. 1A, 1B, and 1C represent three different views or visualizations of the same interface. The interface for embodiments of the invention is easily understood, for example, using an animated format by which features, such as the thresholds 102, 104 may be configured to be shown larger or smaller and the arrows 106, 108 may likewise be animated. It is also to be understood that the different views presented by the Delta gauge visualization 100 may consume the same screen space on a display screen, simply replacing one another, depending on interactions by the user with the system. Thus, embodiments of the invention provide very efficient usage of available screen space.

Further, the Delta gauge visualization 100 provides highly intuitive visualizations that enable editing of a user's strategy on different views with the same look and feel while occupying the same screen space. The example visualization shown in FIG. 1A may be referred to as an edit mode visualization on which a user's strategy may be easily edited with no doubt about what will occur based on the particular strategy. When the user's strategy is entered and accepted on the edit mode visualization, it may be communicated to a processor running a 'robot' or algorithm-based application for execution.

As noted, the example visualization shown in FIG. 1B may show what the current Delta value is and what will happen, according to the user's strategy, when the Delta value reaches a certain level. On the other hand, the example visualization shown in FIG. 1C may be referred to as an alert mode on which the text at the top 118 and bottom 120, as well as the thresholds 102, 104, may be presented in a particular alert color, such as red. An alert may also be provided, for example, by email or SMS or by any other convenient method of alerting the user. As also noted, the alert mode visualization may show an occurrence of a failure to buy or sell a predefined quantity of underlying assets when the Delta value reached a particular threshold level. The alert mode visualization may also show that the current Delta value may be critically above the particular threshold level.

The Delta gauge visualization 100 may be provided, for example, on a display screen of any computing device including, without limitation, a desktop, a laptop, a pad, a tablet, or a mobile phone, by an application, such as a web application, running entirely or partly on a processor of the computing device. Further, the application running on the processor of the computing device may be communicatively coupled, for example, to a processor of a backend server that supplies data for the Delta gauge visualization 100 on the display screen of the computing device.

A Delta profile visualization aspect of embodiments of the invention may employ, for example, an algorithm-based application that manages a Delta risk of a trader's position by placing one or more orders in advance to be executed in the market. A feature of the Delta profile visualization aspect may provide, for example, an interface visualization regarding what will be done when a Spot reaches a certain level. The types of orders that may be placed in advance may include, for example, 'resting' orders, which rest on the market and wait to be filled. For example, a resting order may be an order to take an action, such as sell or buy, when the Eurodollar Spot reaches a certain amount.

An algorithm-based application that may be employed for embodiments of the invention may utilize, for example, two types of commonly used resting orders, such as 'take profit' and 'stop loss' orders. The algorithm-based application may address the Delta profile visualization aspect for embodiments of the invention similarly, albeit not identically, to the Delta gauge visualization interface. The Delta profile visualization aspect may provide an interface that presents a visualization of the actions that will be taken by the application on behalf of a trader in a simple intuitive way on a confined screen space.

If a resting order has been placed on the market, the Delta profile visualization interface may present a visualization of details and execution state of the resting order. For example, if the resting order is to sell 1 million and a sale was accomplished of only 0.5 million, the interface may present a visualization of the details and the execution state of that partial sale. In addition, the Delta profile visualization interface may present a visualization of the proximity of a Delta and corresponding Spot to a threshold dictated by a user's strategy, somewhat similarly to the Delta gauge visualization aspect. Further, the Delta profile interface may present an alert when an action dictated by the user's strategy should have been taken already and what that action should have been, likewise similarly but not identically, to the Delta gauge visualization aspect.

The Delta gauge visualization aspect for embodiments of the invention may focus, for example, on what should happen according to a strategy defined by a user when the Delta reaches a certain threshold. In so doing, the Delta profile visualization aspect may involve, for example, recalculating the Spot at which the Delta is expected to reach a certain size and defining the threshold in terms of estimated or predicted Spot or price. Thus, the threshold may be defined in terms of what will occur if the Spot reaches a certain level, as opposed to what will occur if the Delta reaches a certain size. Put another way, while the Delta gauge visualization aspect may monitor the size of the Delta and present a visualization of what action the application will take when the Delta reaches a certain size, the Delta profile visualization aspect may calculate approximately what such size will be and prepare a resting order to wait for the Spot at that level.

For example, in the Delta gauge visualization aspect, the visualization interface may show that when the Delta reaches plus 1 million, 1 million of underlying assets will be sold, and when the Delta reaches minus 1 million, 1 million of underlying assets will be bought. On the other hand, in the Delta profile visualization aspect, a visualization interface may show that when the Delta reaches 1 million, the estimated Spot will be 1.4, so the resting order may be to sell 1 million in underlying assets when the Spot reaches 1.4, and when the Delta reaches minus 1 million, the estimated Spot will be 1.3, so the resting order may be to buy 1 million in underlying assets when the Spot reaches 1.3.

In embodiments of the invention, defining thresholds may not end the processing of the application. When an action is taken, such as selling 2 million in underlying assets as the Delta reaches 2 million, the Delta then becomes zero and the strategy may be recalculated on the same Delta gauge visualization mechanism. Such recalculation may be an iterative process that continues for an indefinite period of time, such as days or months, using the same visualization construct.

In the Delta profile visualization aspect of embodiments of the invention, an immediate feedback may be provided on an impact of a user's change in strategy parameters on the actions that may be taken by the application, similarly, although not identically, to the Delta gauge visualization aspect. Additionally, the Delta profile visualization aspect may provide a single glance clue as to the way the Delta changes according to the Spot within a relevant range, which may be presented, for example, as an exact plot of Delta per Spot or in a less granular profile of monotonously descending and ascending Delta relative to Spot.

Figure 3A:
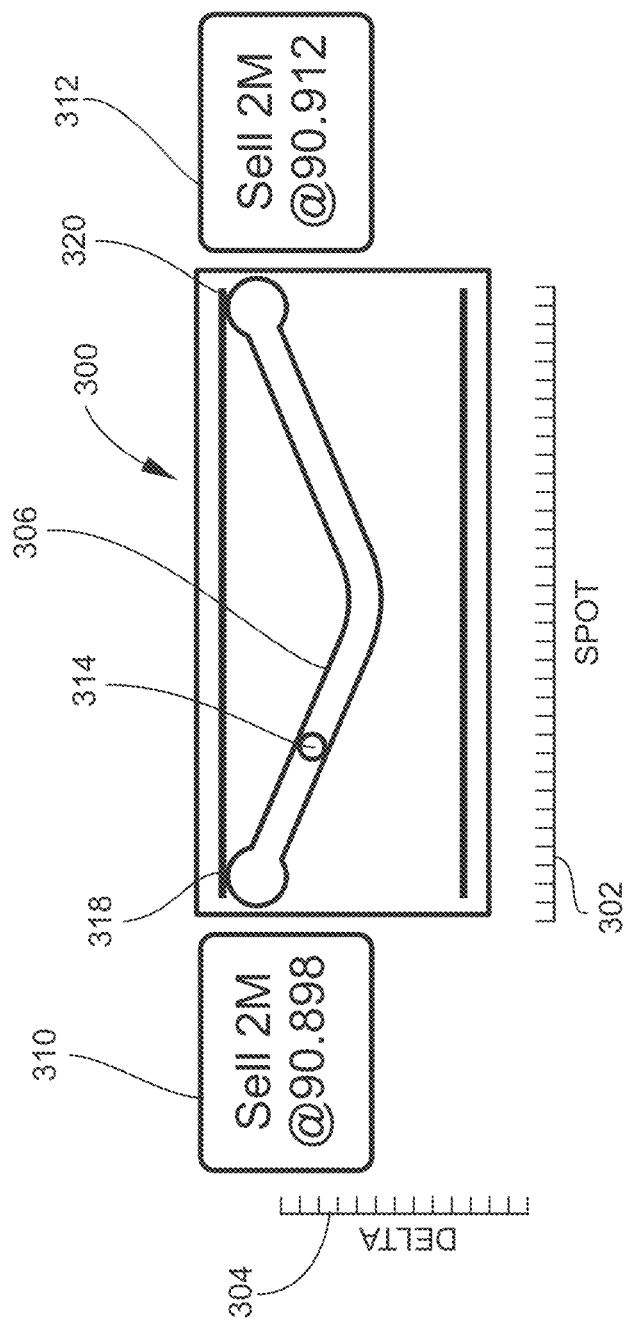
FIGS. 3A, 3B, and 3C illustrate examples of a Delta profile visualization graphical user interface for embodiments of the invention.
Figure 3B:
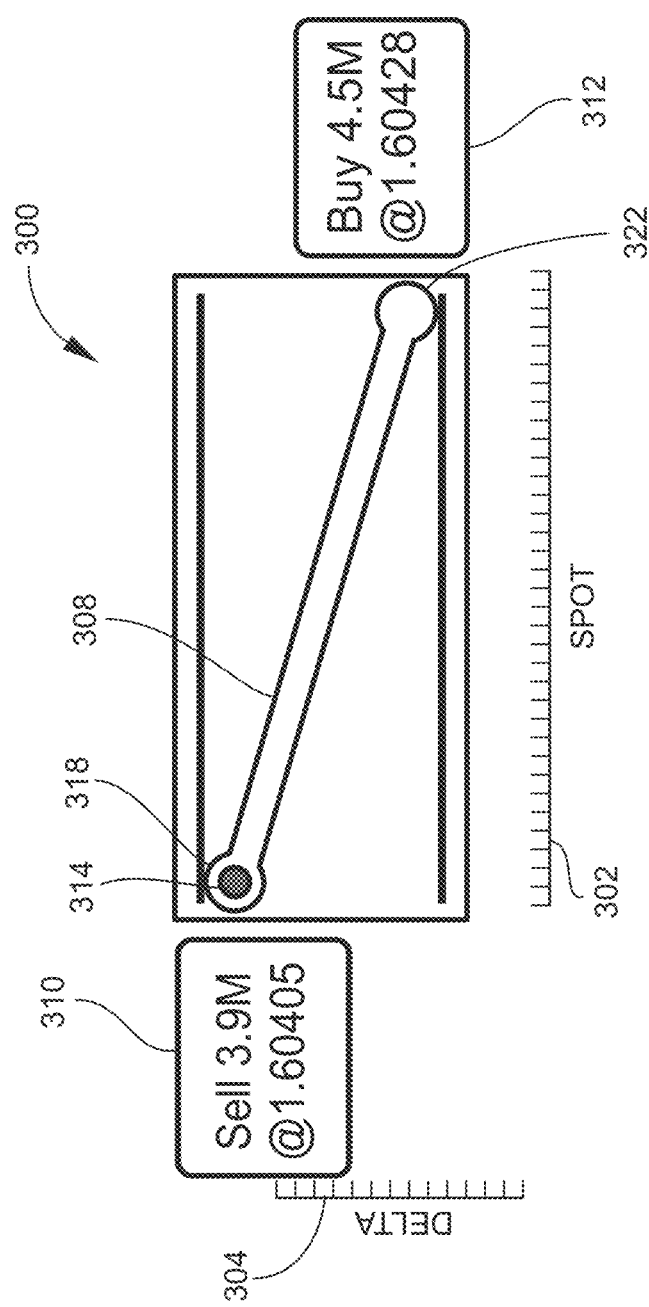
Figure 3C:
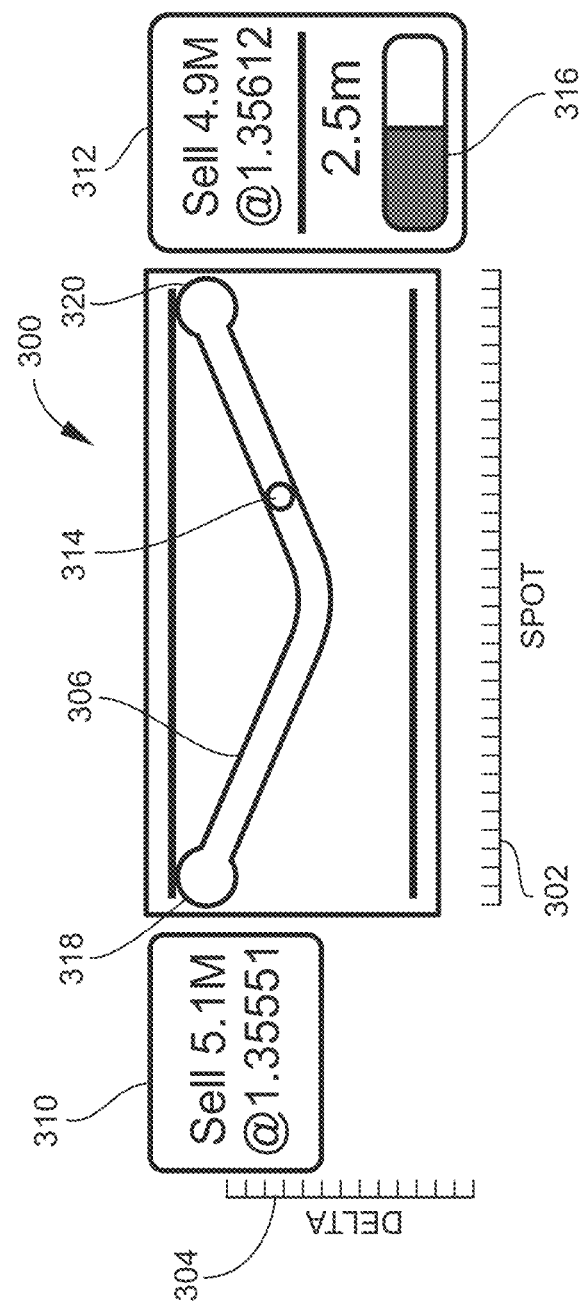

FIGS. 3A, 3B, and 3C show examples of three different views of the Delta profile visualization aspect for embodiments of the invention. In the examples of FIGS. 3A, 3B, and 3C, the Spot may be plotted on the horizontal or X-axis 302 of the visualization 300, and the Delta may be plotted on the vertical or Y-axis 304 of the visualization 300. The Delta profile visualization 300, as shown in the examples of FIGS. 3A, 3B, and 3C, may also include the actual numerical values for the Delta on the Y-axis and the actual values for the Spot on the X-axis as on a graph. The threshold values of Delta 318 and 320 in FIGS. 3A and 3C, and the threshold values of Delta 318 and 322 in FIG. 3B may correspond to the values of Delta on the vertical of Y-axis of the visualization 300.

As can be seen in the examples of FIGS. 3A and 3C, a line or 'tube' 306 of the plot of the Delta profile visualization 300 may indicate that the Delta will decrease as the Spot increases to a point, and beyond that point, the Delta will increase as the Spot continues to increase. On the other hand, referring to the example of FIG. 3B, the line or 'tube' 308 of the plot of the Delta profile visualization 300 may indicate that the Delta will decrease continuously as the Spot increases. When the Delta is monotonously decreasing, it may be referred to as short Gamma, and when the Delta is monotonously increasing, it may be referred to as long Gamma.

Figure 2:
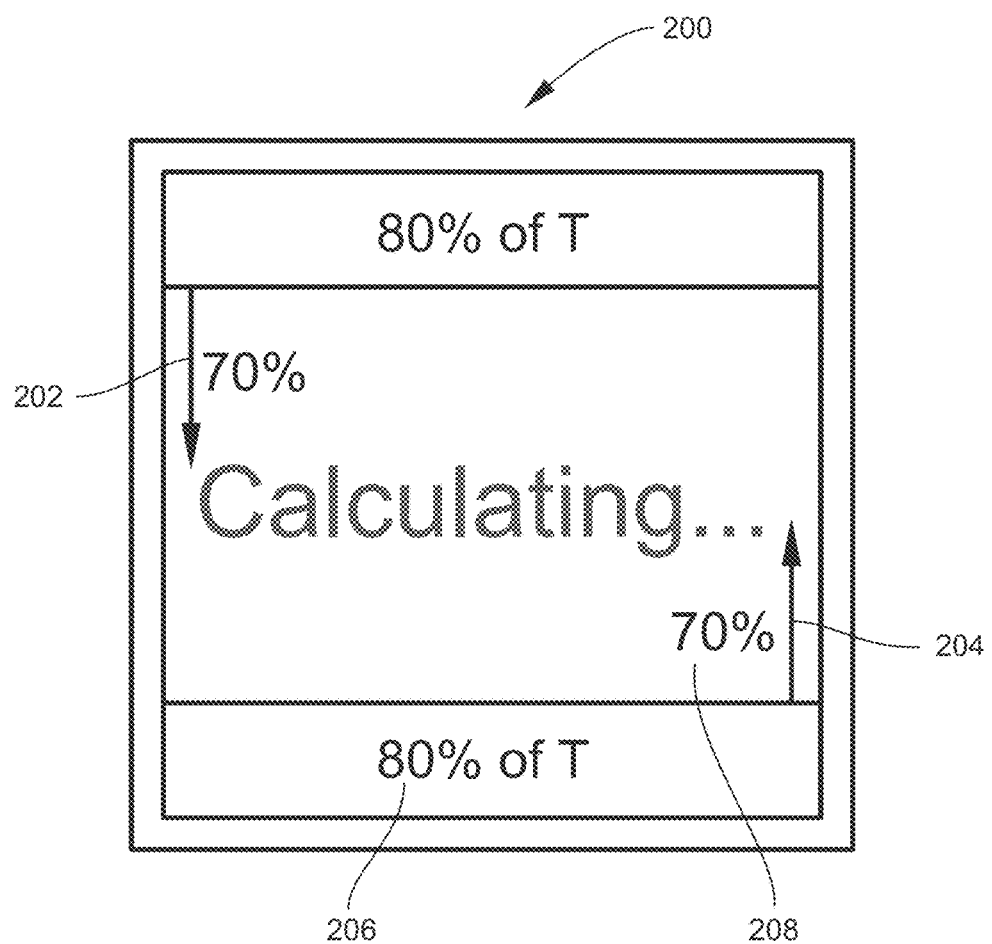
FIG. 2 illustrates an example of a Delta risk gauge strategy visualization graphical user interface for embodiments of the invention.

FIG. 2 illustrates an example of a Delta profile strategy visualization graphical user interface 200 for embodiments of the invention. When a user edits the user's strategy, using an input mechanism such as a keypad, a keyboard, or a slider, all of the visualizations may respond immediately.

For example, in the visualization of FIG. 1A, when the user's strategy is edited, the thresholds 102, 104 may move, the action arrows 106, 108 may change in length, and the numbers may change. Likewise, in the visualization of FIG. 2, when the user's strategy is edited, the respective lengths of the vertical arrows 202 and 204 may change corresponding to a change in the percentage of the underlying assets to be sold or bought entered by a user.

In embodiments of the invention, the threshold 'T' may be a number generated, for example, according to an algorithm of the user, based on multiple factors and market views. Referring to the example of FIG. 2, the percentage of T 206 and the percentage of underlying assets 208 to sell or buy may depend on a level of risk that the user as a market trader is willing to assume. Assume, for example, that the user wishes to represent the user's strategy as a percentage of a T of 10 million. In that case, the percentage of T 206 and the percentage of the underlying assets 208 to be sold or bought may be defined by the user. Referring to the example of FIG. 2, the user may wish to set the Delta at 80% of T and the percentage of Delta threshold at 70% as represented by the vertical arrows 202 and 204. Thus, when the Delta reaches 80% of 10 million or 8 million, 70% of the Delta or 5.6 million will be sold, and when the Delta reaches 80% of minus 10 million or minus 8 million, 70% of the Delta or 5.6 million will be bought.

It is to be noted that a user is not limited to a level of risk that is 100% of the threshold T but may define the level of risk as a percentage that exceeds 100%, such as 150% of T. However, as noted above, a user with a risk limit of 10 million, may define a lower percentage of T, such as 80%, and may likewise define a percentage of underlying assets to be sold or bought, such as 70%. It is to be understood that the foregoing values for T and the respective percentage values are examples only and that a trader may employ any other values suitable to the trader.

Referring to the example of FIG. 3A, when a strategy is selected, the Delta profile visualization 300 may show an action that will be taken if the Spot, as represented on the X axis 302, increases or decreases and the effect the increase or decrease has on the Delta, as represented on the Y axis 304. Referring again to FIG. 3A, if the Spot drops, for example, down to 90.898, according to the defined strategy 310, 2 million of the underlying assets will be sold, and if the Spot spikes up to 90.912, according to the defined strategy 312, 2 million of the underlying assets will likewise be sold. In other words, the trader may have selected a strategy to always sell when the Spot rises or falls more than a certain amount because the Delta profile increases whether the Spot rises or falls.

Assume, for example, that the trader wishes to change the percentage of T from 80%, as shown in the example of FIG. 2, to 90%. As mentioned, the trader may input such a change using keys or a slider or any other suitable input mechanism, and immediately upon receiving the change, a calculation may become visible on the visualization. An application running in the background may use an algorithm to make a quick calculation and immediately display what the resting order will be in the market on a Delta profile visualization similarly as shown, for example, in the Delta profile visualization examples of FIGS. 3A, 3B and 3C.

It is to be understood that FIGS. 3A, 3B, and 3C illustrate examples of Delta profile visualizations of three different scenarios according to three different strategies input by a trader. It is also to be understood that the three different visualizations of different strategies shown in FIGS. 3A, 3B, and 3C are examples only and that other visualizations corresponding to other strategies may be generated as well. For example, in such other strategies, the Delta profile visualization may show the Delta value always increasing, always flat, first increasing and then decreasing, first flat and then increasing, first flat and then decreasing, first increasing and then flat, or first decreasing and then flat.

Referring further to the examples of FIGS. 3A, 3B and 3C, the current state of the Delta value relative to the Spot may be shown by a symbol or icon 314, such as a circle, associated with the plot line 306 or 308 of the visualization. The plot line 306 or 308 of the Delta profile visualization may be represented, for example, as a tube. The symbol or icon 314 representing the current state may, of course, have any suitable shape and/or color, such as blue or red, or no color at all. As shown in FIG. 3A, the position of the symbol or icon 314 proximate the left end of the plot 306 indicates that the Delta value is very near a situation in which the Spot is predicted to be 90.898 at which point the resting order 310 will be filled by selling 2 million of underlying assets.

Referring to the example of FIG. 3B, if the Spot crosses a defined spot threshold without the resting order to sell underlying assets having been executed for some reason, an alert may be generated immediately. The alert may comprise, for example, highlighting the resting order 312 or its border in a particular color, such as red, and/or displaying the symbol or icon 314 representing the current state of the Delta value relative to the Spot in a color, such as likewise in red. Further, assume that the Delta value continues to increase after the resting order was not executed. In that event, the example visualization shown in FIG. 3B may modify the action that should now be taken and may indicate, for example, that the Delta has crossed the defined threshold and increased to 3.9 million, that the Spot is 1.60428, and that the trader should trade immediately.

Referring to the example of FIG. 3C, the Delta profile visualization may also provide an indication of what happens when orders are actually in the market, such as orders that have been submitted to the market and were only partially filled. For example, as soon as the orders are placed in the market, the Delta profile visualization may provide an indication that the orders 310 and 312 are in the market and will be executed by highlighting the order in a frame of a particular color, such as blue or any other suitable color. As shown in FIG. 3C, for example, an attempt to execute the order 312 to sell 4.9 million of the underlying assets may have been only partially successful with only 2.5 million of the underlying assets being actually sold. In addition, a progress bar 316 may be generated, for example, in association with the partially executed order 312 as an indication that sale of underlying assets was only partially successful and that the order 312 still rests in the market with a balance of underlying assets remaining to be sold that corresponds, for example, to a position or length of the progress bar 316.

In an aspect, one or more applications for embodiments of the invention may comprise, for example, a completely independent or target application running only on a processor of a client computing device, such as a laptop, desktop, pad, or mobile phone, that receives market data, for example, from a processor of a back end or host server. In another aspect, one or more applications for embodiments of the invention may comprise a two-tier client-server application with the user interface running on the client and the application logic running on either or both of the client processor or the server processor, for example, with quantitative calculations on market data being performed on the server processor.

Figure 4:
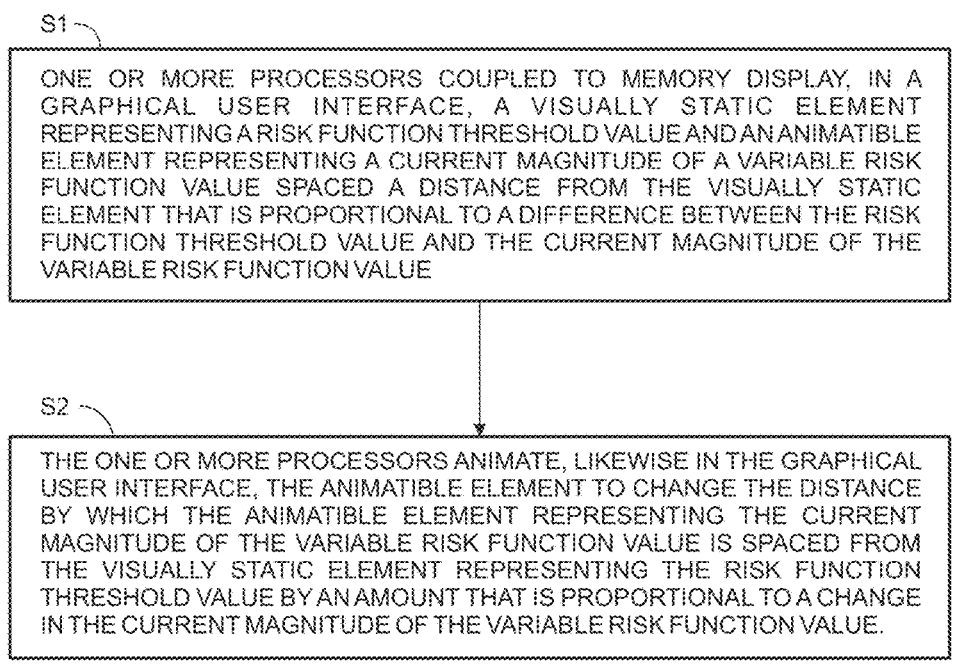
FIG. 4 is a flow chart that illustrates an overview example of the graphical user interface display and animation process for embodiments of the invention.

FIG. 4 is a flow chart that illustrates an overview example of the graphical user interface display and animation process for embodiments of the invention. Referring to FIG. 4, at S1, one or more processors coupled to memory may display, in a graphical user interface, a visually static element, such threshold 102 in FIG. 1A or threshold 318 in FIG. 3A, representing a risk function threshold value and an animatible element, such as arrow or pointer 108 in FIG. 1A or icon 314 in FIG. 3A, representing a current magnitude of a variable risk function value spaced a distance from the visually static element that is proportional to a difference between the risk function threshold value and the current magnitude of the variable risk function value.

Referring further to FIG. 4, at S2, the one or more processors may animate, in the graphical user interface, the animatible element to change the distance, such as the distance between the pointer or arrow 108 and threshold 102 in FIG. 1A or the distance between icon 314 and threshold 318 in FIG. 3A, by which the animatible element representing the current magnitude of the variable risk function value is spaced from the visually static element representing the risk function threshold value by an amount that is proportional to a change in the current magnitude of the variable risk function value.

It is to be understood that the application code for embodiments of the invention may be built, for example, in multiple layers (e.g., WPF, JAVA, C++, and C #) to allow its flexibility. It is to be further understood that embodiments of the invention may be implemented as processes of a computer program product, each process of which is operable on one or more processors either alone on a single physical platform, such as a personal computer, or across a plurality of devices, connected by a system or network, including networks such as the Internet, an intranet, a WAN, a LAN, a cellular network, or any other suitable communication network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public communication network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
    displaying, by one or more processors coupled to memory, in a graphical user interface, a visually static element representing a risk function threshold value and an animatible element representing a current magnitude of a variable risk function value spaced a distance from the visually static element that is proportional to a difference between the risk function threshold value and the current magnitude of the variable risk function value;
    animating, by the one or more processors, in the graphical user interface, the animatible element to change the distance by which the animatible element representing the current magnitude of the variable risk function value is spaced from the visually static element representing the risk function threshold value by an amount that is proportional to a change in the current magnitude of the variable risk function value; and
    generating, by the one or more processors, in the graphical user interface, an alert visualization when said animation of the animatible element representing the current magnitude of the variable risk function value is animated to move beyond the visually static element representing the risk function threshold value.

2. The method of claim 1, wherein displaying the visually static element representing the risk function threshold value further comprises displaying, in the graphical user interface, the visually static element at a position on a graduated scale of risk function values.

3. The method of claim 1, wherein displaying the visually static element representing the risk function threshold value further comprises displaying, in the graphical user interface, the visually static element in reference to a position on a plot of risk function values against predicted price values.

4. The method of claim 1, wherein displaying the animatible element further comprises displaying, in the graphical user interface, a pointer element spaced the distance from the visually static element that is proportional to the difference between the risk function threshold value and the current magnitude of the variable risk function value.

5. The method of claim 1, wherein displaying the animatible element further comprises displaying, in the graphical user interface, an elongate pointer element having a length that is proportional to the current magnitude of the variable risk function value.

6. The method of claim 1, wherein displaying the animatible element further comprises displaying, in the graphical user interface, an icon animatible to move in a path defined by a relationship between variable risk function values and variable predicted price values.

7. The method of claim 6, wherein displaying the animatible element further comprises displaying, in the graphical user interface, the animatible icon in association with a plot of variable risk function values against the variable predicted price values.

8. The method of claim 1, wherein animating the animatible element further comprises animating, in the graphical user interface, an elongate pointer element having a length that is proportional to the current magnitude of the variable risk function value to increase the length of the elongate pointer by an amount that is proportional to the change in the current magnitude of the variable risk function value.

9. The method of claim 8, wherein animating the animatible element further comprises animating, in the graphical user interface, the elongate pointer element to increase the length of the elongate pointer by the amount that is proportional to the change in the current magnitude of the variable risk function value in a direction parallel to a graduated scale of variable risk function values.

10. The method of claim 1, wherein animating the animatible element further comprises animating, in the graphical user interface, an icon to move in a path defined by a relationship between variable risk function values and variable predicted price values.

11. The method of claim 1, further comprising displaying, in the graphical user interface, an action to be performed when the current variable risk function value equals the risk function threshold value.

12. The method of claim 11, wherein displaying the action to be performed further comprises displaying, in the graphical user interface, a resting order to be executed when the current variable risk function value equals the risk function threshold value.

13. The method of claim 1, further comprising displaying, in the graphical user interface, an action to be performed when the current variable risk function value moves beyond the risk function threshold value.

14. The method of claim 1, further comprising displaying, in the graphical user interface, a second visually static element representing a second risk function threshold value.

15. The method of claim 14, wherein one of said visually static element and said second visually static element displayed in the graphical user interface represents a positive risk function threshold value and the other of said visually static element and said second visually static element displayed in the graphical user interface represents a negative risk function value.

16. A system comprising:
one or more processors; memory coupled to the one or more processors and configured for storing instructions, which, when executed by the one or more processors, causes the one or more processors to perform operations comprising:

displaying, in a graphical user interface, a visually static element representing a risk function threshold value and an animatible element representing a current magnitude of a variable risk function value spaced a distance from the visually static element that is proportional to a difference between the risk function threshold value and the current magnitude of the variable risk function value; and animating, in the graphical user interface, the animatible element to change the distance by which the animatible element representing the current magnitude of the variable risk function value is spaced from the visually static element representing the risk function threshold value by an amount that is proportional to a change in the current magnitude of the variable risk function value; and generating, in the graphical user interface, an alert notification when said animation of the animatible element representing the current magnitude of the variable risk function value is animated to move beyond the visually static element representing the risk function threshold value.

17. A non-transitory computer readable storage medium storing one or more programs, the one or more programs comprising instructions, which when executed by an electronic device with a display, cause the device to:

display, in a graphical user interface on the display, a visually static element representing a risk function threshold value and an animatible element representing a current magnitude of a variable risk function value spaced a distance from the visually static element that is proportional to a difference between the risk function threshold value and the current magnitude of the variable risk function value;

animate, in the graphical user interface on the display, the animatible element to change the distance by which the animatible element representing the current magnitude of the variable risk function value is spaced from the visually static element representing the risk function threshold value by an amount that is proportional to a change in the current magnitude of the variable risk function value; and generate, in the graphical user interface on the display, an alert notification when said animation of the animatible element representing the current magnitude of the variable risk function value is animated to move beyond the visually static element representing the risk function threshold value.

\* \* \* \* \*